Figure 1:
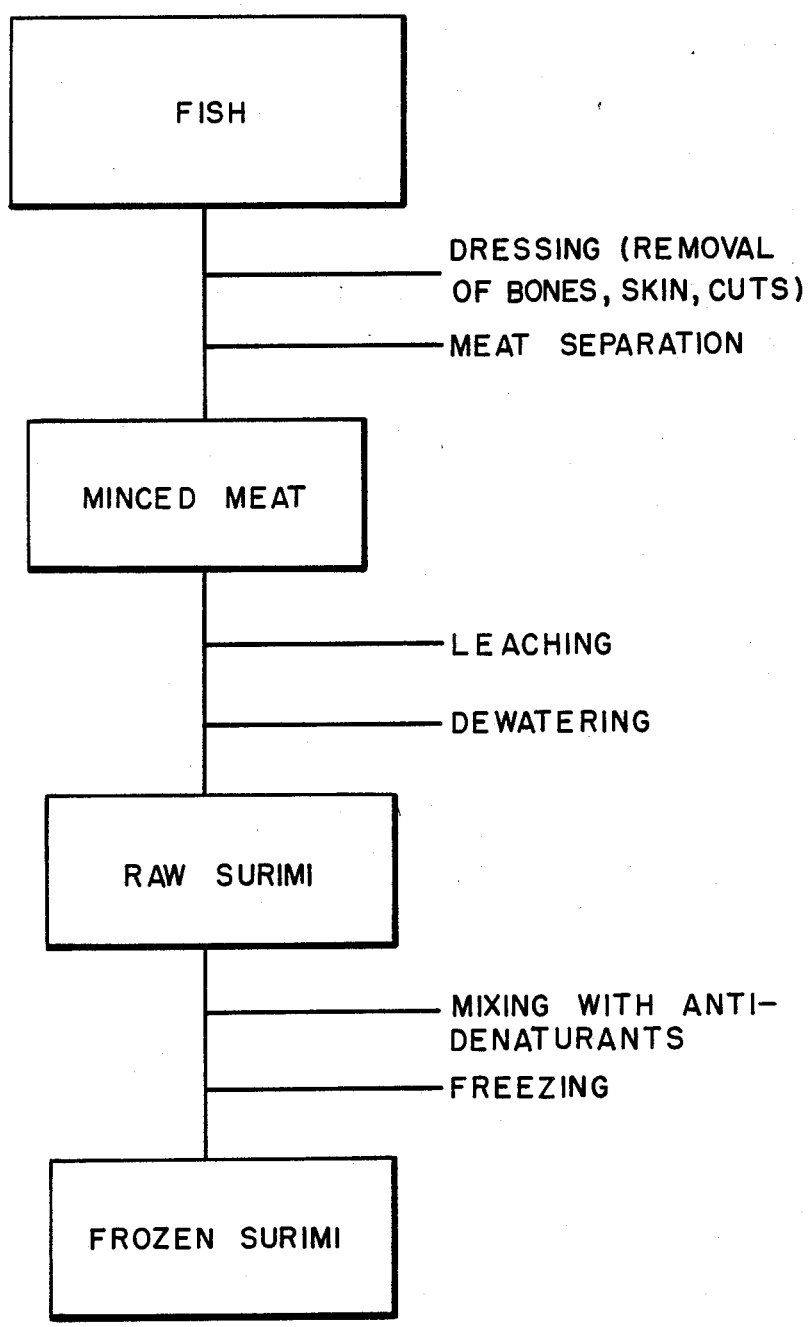

United States Patent [19]

Gray et al.

[11] Patent Number: 4,888,181

[45] Date of Patent: Dec. 19, 1989

[54] SEA FOOD FLAVORED FOOD PRODUCTS

[75] Inventors: Robert D. Gray; Thomas J. Gray, both of Gloucester, Mass.

[73] Assignee: Nu-C Products Inc., Gloucester, Mass.

[21] Appl. No.: 41,469

[22] Filed: Apr. 23, 1987

[51] Int. Cl.$^4$ .......................... A23L 1/325; A23J 1/04
[52] U.S. Cl. ..................................... 426/643; 426/656
[58] Field of Search ......................................... 426/643

[56] References Cited

U.S. PATENT DOCUMENTS

| | | | |
|---|---|---|---|
| 81,987 | 9/1868 | Cutler | 426/643 |
| 2,284,913 | 12/1939 | McComb | 426/461 |
| 3,712,821 | 1/1973 | Ronsivalli et al. | 426/643 |
| 3,863,017 | 1/1975 | Yueh | 426/643 |
| 4,181,749 | 1/1980 | Niki et al. | 426/643 |
| 4,405,653 | 9/1983 | Gray | 426/471 |
| 4,579,741 | 4/1986 | Hanson | 426/643 |
| 4,588,601 | 5/1986 | Maruyama et al. | 426/643 |

OTHER PUBLICATIONS

Lee, Chong M., Surimi Manufacturing and Fabrication of Surimi-Based Products, Food Technology, Mar. 1986, vol. 40, No. 3, pp. 115–125.

Primary Examiner—Donald E. Czaja
Assistant Examiner—Helen Pratt
Attorney, Agent, or Firm—E. J. Berry

[57] ABSTRACT

Processes, methods, food products, and uses for modified surimi containing food products using surimi in novel combinations which include up to about 50% by weight of dehydrated concentrated fish meat, said mixtures prepared under special, controlled conditions using combinations of novel steps to produce novel seafood and/or meat flavored foods.

14 Claims, 2 Drawing Sheets

SEA FOOD FLAVORED FOOD PRODUCTS

FIELD OF THE INVENTION

The invention involves process and methods for preparation of the products known in the market-place as surimi and surimi containing and surimi flavored products using dehydrated fish concentrates as one of the major ingredients and as a major composition in the production of such surimi, including the use of specially selected dehydrated fish concentrates in surimi and surimi based food products.

BACKGROUND OF THE INVENTION

Surimi is the name used to define a certain refined form of minced fish flesh or meat. It is not itself considered or used alone as a food stuff. It is traditionally employed as an intermediate raw material from which numerous traditional Japanese kneaded foods called "Kamaboko" are manufactured. In addition, imitation shrimp, scallop and crab meat and other meat products made from surimi.

The Japanese word "surimi" literally means "minced meat". However, the product called surimi is more than minced meat. It has very important and two major distinguishing features. These are its gel-forming capacity, which allows it to assume almost any texture desired, and its long-term stability in frozen storage, this being imparted by the addition of sugars as cryoprotectants. Other useful advantages include the possibility for control of moisture content and color and flavor retention throughout handling and storage.

When fish (meat) muscle is separated from bones, skin, and entrails, and then comminuted, it is commonly referred to as minced meat. Thus, minced fish meat becomes raw or unfrozen surimi after it has been washed to remove fat, and preferably most water-soluble constituents.

Raw surimi as above described is a truly bland material, since at least some of its flavor components are removed by the leaching process. Also, the washing isolates the fish meat's myofibrillar protein, which is insoluble in fresh water and possesses the essential gel-forming capacity so prized by the kamaboko-maker. When raw surimi is mixed with antidenaturants and frozen, the product is called frozen surimi and is so known in the commercial trade area.

The Japanese food industry has been practicing the art of manufacturing surimi for many centuries using a vareity of traditional methods for processing fish into so-called raw surimi and thereafter, converting it into finished food products.

In the past, both the fish starting material and the raw surimi deteriorated and denatured rapidly and thus became useless as food. Completely processing was necessary at the greatest possible speed.

Alaska pollock is and has traditionally been the staple raw material fish for the Japanese surimi industry. Though almost any variety of fish can be used satisfactorily to make surimi, no other species of fish has the combination of abundance, economy, and quality advantages provided by the pollock.

For instance, the five years from 1980 to 1984, an annual average of about 1.5 million metric tons of Alaska pollock was used for surimi production in Japan or on Japanese vessels. This tonnage represented about 87 percent of all the raw material fish used for surimi during that time. Thus, it can be seen that, for the current, marketplace, Alaska pollock is overwhelmingly the fish of choice.

About 1960, the possibility for making frozen surimi was discovered and this frozen product began to be exploited. This development revolutionized the entire surimi industry including the methods for making and using both the surimi and surimi based products. Tremendous expansion of the surimi industry has resulted together with modernization and ever-growing demand.

Also, kamaboko processors had been searching for a way of storing raw surimi in order to liberate the manufacturing process from fluctuations in quality and supply of raw material fish. Even if raw surimi was frozen it lost gel-forming capacity in a matter of weeks or months, and the quality was inconsistent from one lot to the next, which interferred with handling and merchandising.

SUMMARY OF THE INVENTION

There are a number of objectives of the invention.

These objectives include a substantial reduction in cost for the frozen surimi product as well as various food products made there from.

Another objective is the avoidance of refrigeration as the surimi itself and products can be shipped in dehydrated dry form and refrigeration is unnecessary and/or minimized. In this connection, handling and shipping are easier and more convenient for a substantially dry rather than a potentially wet product. There is also a long expectation for shelf life for the product(s) which can be stored at higher temperatures.

Another objective is the increased and more consistent nutritional value. For example, there is a somewhat higher minimum protein content as well as reduction in the over-all amounts of preservatives and additives, and less sodium content in the surimi and the food products made therefrom. Using this method, more of the natural unsaturated fats and oils of the original fish source are retained in the final food product.

Other objectives and advantages will be disclosed and become evident from the detailed description below.

DETAILED DESCRIPTON OF THE INVENTION

Freeze denaturation is not well understood. In general, when a protein becomes denatured, it loses its native chemical structure and its ability to perform certain biochemical functions such as forming a gel or holding onto water. In the terminology of food science, this is called loss of functionality. Denaturation of proteins can be triggered by extreme temperatures (usually heat), by pH changes, or by the formation of ice crystals between or inside muscle cells. Metal ions such as the iron in hemoglobin, or water soluble enzymes, can catalyze denaturation. All of these forces are at work in frozen minced fish, and identification of the mechanism of freeze denaturation is a complex problem.

The successful development of Alaska pollock frozen surimi, which is protected from freeze denaturation, was announced independently by researchers at Hokkaido Fisheries Research Laboratory (Nishiya et al., 1960; Tamoto et al..)

The anti-denaturant additives applied by the Hokkaido group consisted of 4 percent sucrose, 4 percent sorbitol and 0.25 percent tripolyphosphate, while the formula developed at Kyoto University consisted of 5 percent sucrose, 5 percent sorbitol, and 2.5 percent salt, which are alternatives as to product composition for the presently manufactured and marketed surimi.

The product identified as dehydrated fish concentrate as disclosed for example in U.S. Pat. No. 4,405,653 is a dry, storable, dehydrated fibrous fish and is unique in that when reconstituted with water has the same nutritional value, odor and taste as does the original fish. The protein composition is undenatured and has a further advantage when reconstituted with water in that it possesses the essential gel-forming capacity needed in the production of the sea food analogs containing surimi and which are the subject matter of this invention.

Dehydrated fish concentrate is a product which comprises essentially dry, storable, dehydrated fibrous fish products the process for making same from various raw materials including without limitation underutilized fish species or deboned fresh or frozen fish scrap and various parts. The process for making the novel product includes mincing, followed by a one-step, controlled, dehydration under conditions of reduced pressure and in the absence of an oxidizing atmosphere such as air, and at elevated temperatures of up to 95° C., and in the absence of any other added ingredients.

The raw materials for the novel dehydrated product of the invention include whole fish or fish parts, and fish scrap for instance, derived from frozen fish block cutting operations. The whole fish or fish parts are eviscerated and subjected to processing in a meat/bone separator whereby the flesh is separated from the bone and gristle. The resulting fish flesh or meat is in a minced form at this point in the process.

For example, the starting raw fish material can be under-utilized whole fish such as, whiting, hake, pollock or dog fish. A major source of raw material is fish frames (carcass), resulting from fresh fish filleting operations. Normally, fish frames are processed in rendering plants into fish meal. Fish meal and its by-products, fish oil and stick water, are generally not suitable for human consumption. Any white fish frames, for instance, cod, haddock, pollock, or flounder, which are handled under good sanitary conditions, are suitable starting materials for this product.

By following the process of the above identified patented invention, a final product is obtained which is a dry flaky fiber, having an off-white color and totally fit for human consumption without requiring refrigeration. It is completely stable for storage at room temperature indefinitely if kept sealed in air-tight packaging. The dry product is easily reconstituted by the addition of water or other potable liquid, and has the same taste, textures, and nutritional value as the whole fish flesh from which it was prepared.

The dehydrated fish product can be reconstituted for example, by the mixing of 1 part fish product and 4 parts water, all parts by weight. The reconstituted product has the same nutrient value as whole fish. The reconstitution step is a part of the process of this invention and the products produced thereby. The dehydrated fish concentrate product needs no refrigeration. It readily increases in weight by up to 80% when mixed with water.

The flake or fiber product of the dehydrated fish concentrate invention differs from known products such as fish flour or fish protein concentrate in that a selected portion of the fish, namely predominantly the fish flesh is the raw material. For this product, no attempt is made to remove odor producing bodies, essential flavors or fish oil by solvent or other means of extraction. Thus it is possible to produce the DFC product at a cost far less than that of fish flour.

It is especially important that the preparation of the preferred deboned, minced fish is such as to avoid damage to the fish fiber. The fish is not subjected to milling or grinding. The fish material is pumped into the evaporation system and maintained in a non-foaming condition. Although the fish muscle is broken during the deboning process, the end product results in a fish fiber, and not a powder. The final dehydrated product, because it is not subjected to surface oxidation, is readily reconstituted by absorbing water. Thus, when cooked into a food product, the fish keeps it characteristic fibrous texture and flavorful fish taste. Another essential condition for preparation of this fish product is not remove or extract the natural fish oils and essential flavors from the fish. It is therefore not necessary to add chemicals to impart the fish flavor or odor. it is thus a much preferred ingredient for use in the surimi.

In the production of surimi sea food flavor analogs according to this invention the minced fish is washed until all water soluble protein and fat is removed. The washed portion removed from the flesh amounts to 10% by weight of the minced fish. The washed out portion also removes from the flesh most of the nutrients of the fish flesh. In order to produce a product will gel forming capacity it is then necessary to mix in antidenaturants. The resulting product is high in sodium and low in nutritional values such as niacin and other amino acids.

The dehydrated fish concentrate product described above and claimed in U.S. Pat. No. 4,405,653 can replace a portion of the surimi presently used in the manufacture of certain seafood analogs. It can be added in amount up to 60% by weight with the washed and chemically mixed surimi prior to adding the selected seafood flavoring. The resulting products after being mixed with the sea food flavoring and extruded has the same color, texture and taste as those corresponding products made from 100% surimi.

The surimi product in which the dehydrated fish concentrate is substituted has a protein content of up to 23% as compared to 16% as presently manufactured. It has lower sodium, sugar and phosphate content and added nutritional value, It has been found that the surimi-DFC mixtures produced by the process of this invention are commercially practical and useful up to products having about 60% by weight of the dehydrated fish concentrate present. It is preferred to use an amount of about 20% up to about 50% by weight of the dehydrated fish concentrate. There are no significant differences found in color, texture, taste and general acceptance for these mixtures.

The seafoods which can be prepared from these products include imitation scallop, shrimp and crab meat as well as others.

ILLUSTRATIVE COMPOSITIONS

In a typical, general method and process which can be carried out either in relatively small batches, or as a batch, semi-continuous, or continuous commercial process, the dehydrated fish concentrate preferable prepared as described above and in U.S. Pat. No. 4,405,653 is added to and incorporated into the surimi or surimi based product as one of the major ingredients thereof.

It may be added for instance, directly to the raw or frozen surimi. The dehydrated fish concentrate used as the addition product, is preferably reconstituted by addition of appropriate amounts of water but without washing or further addition of anti-denaturants. The resulting product is then further treated in any way as required and/or as may be desired to reproduce, for instance, the above referred to, kamaboko or to make imitation crabmeat, shrimp, scallops and the like.

Also, the novel DFC-surimi product, may be used in tempura, chikuwa, or fish sausage, fish ham, or fish frankfurters.

The resulting products have been found to be equal to, or superior, in taste, color, texture and keeping qualities to the surimi product inself, which has achieved very great wide spread consumer acceptance. The surimi-based products containing the DFC also offer advantages in health qualities as they are relatively high protein, low calorie, and low in cholesteral.

They are also competitive in cost to the surimi itself, the DFC, as well as the natural seafood products themselves.

FIGURES

Figure 2:
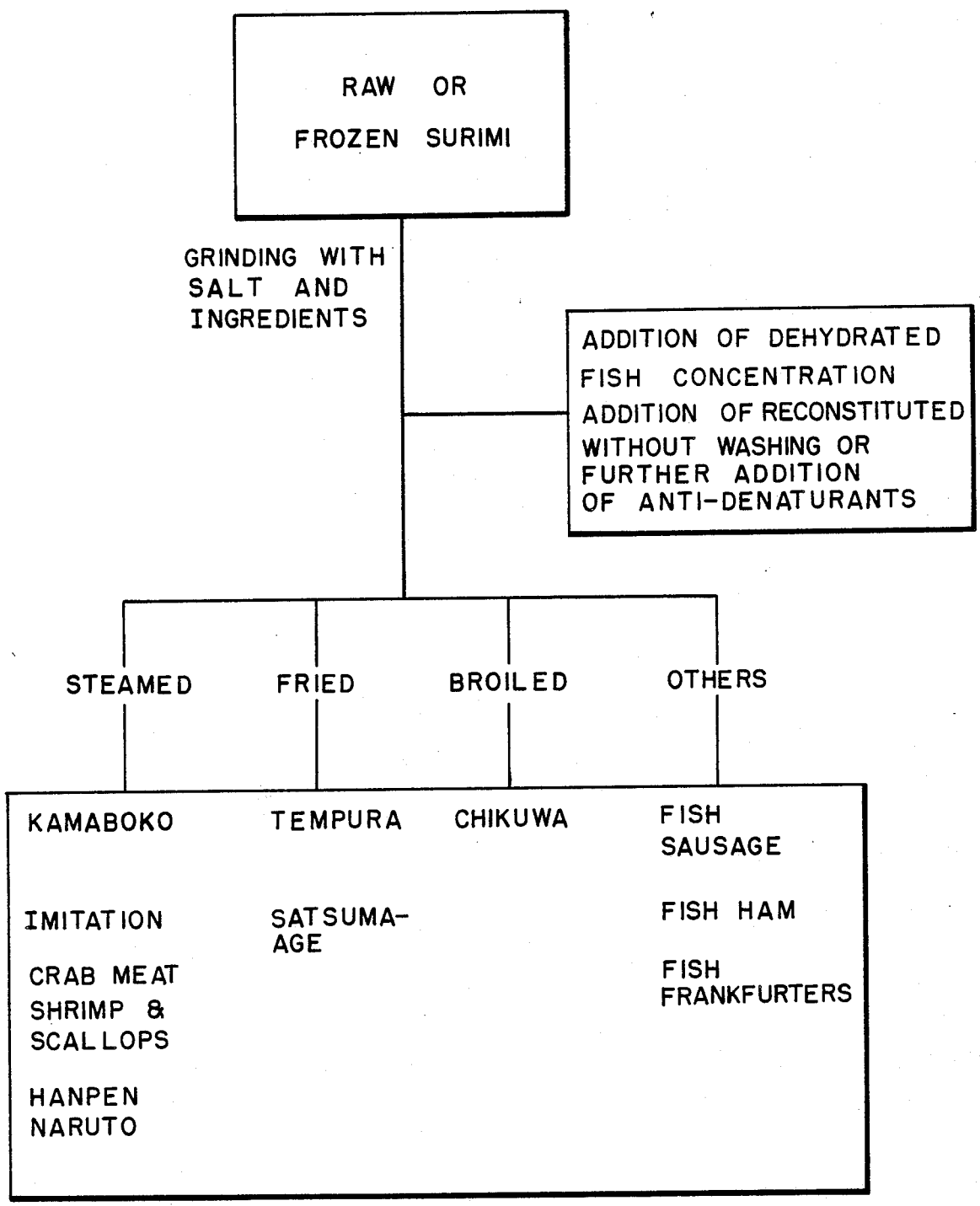

FIGS. 1 and 2, included herewith as a part of the specification of this application and of the invention disclosure, are schematic flow sheet for better and complete disclosure of the invention.

FIG. 1 shows the flow diagram for convention preparation of the surimi product itself, although other procedures and steps may be employed for making of the surimi product blends of the invention, in this instance, frozen surimi.

The raw fish (pollock, whiting, haka, cod, haddock, flounder) is "dressed" or prepared by removal of bone, scales, skin and other unwanted or inedible parts and the meat, to be used in the preparation of the surimi, separated. After mincing, it is leached and dewatered. This raw surimi is then mixed with anti-naturants and such other non-fish, non-meat additives as may be desired or required. After that, the modified product is subjected to one or more freezing stops, to produce the frozen surimi product.

FIG. 2 shows the modified and additional steps used for producing the dehydrated concentrated fish-surimi products of this invention.

The raw or frozen surimi, prepared, for instance, as described in FIG. 1, after grinding shedding, or mincing with salt or such other ingredients as desired, is admixed with dehydrated fish concentrate preferably but not necessarily prepared as described in U.S. Pat. No. 4,405,653 with or without complete reconstitution, but without washing or further addition of anti-denaturants or other additives.

After thorough mixing has been accomplished, the resulting surimi-dehydrated fish concentrate product can be steamed, fried, broiled or otherwise cooked and/or treated for conversion to the final food products desired.

The following examples are illustrative and typical of the processes, methods and products of the present invention, but are not intended to be construed as strictly limited thereto.

EXAMPLES

Examples 1-4

Examples of crab flavor seafood analogs dehydrated fish concentrate were evaluated in a crab flavored stick product. An important objective of this work was to determine if DFC can be used to replace a portion of the surimi presently used to manufacture imitation crab food analogs. The results obtained were, in every way, entirely positive and satisfactory.

Crab flavored analogs were produced with various composition (as indicated below) of DFC substituted for the frozen surimi. The dehydrated fish concentrate was rehydrated with water by blending approximately 28.1% dehydrated fish concentrate with approximately 1.9% water. The dehydrated fish concentrate and surimi ingredients were mixed as described in the following proportons and specific examples.

| Example 1 Dehydrated fish concentrate 40% DFC | |
|---|---|
| Ingredient | % |
| Frozen Surimi | 45.94 |
| DFC | 30.62 |
| Salt | 1.92 |
| Ice water slush | 10.50 |
| Egg white solution | 6.00 |
| Sugar | 0.40 |
| Potato Sarch, unmodified (Colby) | 4.00 |
| MSG (Ajinomoto) | 0.40 |
| ITG (Ajinomoto) | 0.01 |
| Crab Flavor (Takosaga) | 0.11 |
| Shrimp Flavor (Takosaga) | 0.07 |

| Example 2 50% dehydrated fish concentrate | |
|---|---|
| Ingredient | % |
| Frozen Surimi | 38.28 |
| Dehydrated fish concentrate | 38.28 |
| Salt | 1.92 |
| Ice water slush | 10.50 |
| Egg white solution | 6.00 |
| Sugar | 0.40 |
| Potato Starch, unmodified (Colby) | 4.00 |
| MSG (Ajinomoto) | 0.40 |
| ITG (Ajinomoto) | 0.04 |
| Crab Flavor (Takosaga) | 0.11 |
| Shrimp Flavor (Takosaga) | 0.07 |

| Example 3 60% Dehydrated fish concentrate | |
|---|---|
| Ingredient | % |
| Frozen Sirimi | 45.94 |
| Dehydrated fish concentrate | 69.38 |
| Salt | 1.92 |
| Ice water Slush | 10.50 |
| Egg white solution | 6.00 |
| Sugar | 0.40 |
| Potato Starch, unmodified (Colby) | 4.00 |
| MSG (Ajinomoto) | 0.40 |
| ITG (Ajinomoto) | 0.04 |
| Crab Flavor (Takosaga) | 0.11 |
| Shrimp Flavor (Takosaga) | 0.07 |

| Example 4 0% Dehydrated fish concentrate | |
|---|---|
| Ingredient | % |
| Frozen Surimi | 76.56 |
| Dehydrated fish concentrate | .0 |
| Salt | 1.92 |
| Ice water slush | 10.50 |
| Egg white solution | 6.00 |
| Sugar | 0.40 |
| Potato Starch, unmodified (Colby) | 4.00 |
| MSG (Ajinomoto) | 0.40 |
| ITG (Ajinomoto) | 0.04 |
| Crab Flavor (Takosaga) | 0.11 |
| Shrimp Flavor (Takosaga) | 0.07 |

Each of the above mixtures was processed using the following procedure and steps:

(1) The dehydrated fish concentrate, sugar, potato starch and salt were combined and blended well using a Hobart Model #L800 blender on Medium speed.

(2) The indicated amount of water was slowly added during the mixing period.

(3) The indicated mixture is removed from the mixer and stored in a cooler (30°-34° F.). Under these conditions it is allowed to rehydrate completely prior to use. In general, the time required is at least 30 minutes or more.

(4) In order to maintain temperatures below 60° F. through out the processing of the crab sticks, it is necessary to allow the rehydrated dehydrated fish concentrate to again reach 32° F. prior to formulation of crab sticks.

Preparation of Crab Flavored Sea Sticks (Crab Food Analog)

(1) The frozen surimi is sawed or otherwise separated into strips (Butcher Boy food saw, model #B-12).

(2) These surimi strips are then ground through 0.5 inch plate (Hobart grinder, model #4732).

(3) The resulting partially frozen surimi and chilled rehydrated dehydrated fish concentrate are then combined, and half of the salt, the starch and water are added. After blending (3 minutes) the remaining salt, starch and water are added and blended (3 minutes). During these steps the temperature is maintained at about 40° F.

(4) The other flavorings, including MSG and sugar, are combined and added to the emulsion. This mixed is then blended (3 minutes) at a temperature of about 45° F.

(5) After this the egg white solution is added and blended 5 minutes on high speed ("1" setting).

(6) About three-fourths (75%) of the resulting paste is formed into 1 inch thick blocks and steamed to set. This step can be eliminated if crab analogue processing equipment is used. Instead, the paste itself can be formed into a thin sheet and subjected to steam/and/or heat in order to set the gel.

(7) The resulting gel is texturized by cutting into thin noodle-like strings.

(8) The crab sticks product are formed by combining 75% of these noodle-like strings with 25% of the paste (which was not processed in Step 6). The mixture is blended for 60 seconds or until paste is dispersed. In this step, it is most important and critical to avoid overblending.

(9) The crab sticks are formed on Autoprod extruder using the "Stick/finger" die (Model F).

(10) The product is "heat set" at 104° F. for 10 minutes in steam chamber and vacumm packaged (Koch Vacuum sealer, Model # ).

(11) The packaged product is thereafter steamed at 195° F. for 30 minutes.

(12) After final steaming, the packaged product is frozen in accord with standard procedures.

Preparation Instructions:

The packaged product is thawed under refrigeration and may be served cold or hot. Cocktail sauce is an excellent condiment for serving with the Sea Sticks but other taste enhancing condiments may be used as desired.

Product Taste Test Evaluation

The product containing 60% substitution of dehydrated fish concentrate lacked the rigid gel matrix and the white color of the control product which contained no DFC. The product containing 50% substitution of dehydrated fish concentrate had a slightly to moderate "off-white" color, when compared to the control product. The products containing 20 and 40% substitution of dehydrated fish concentrate for surimi were very similar to the control in color, texture and flavor.

Sensory evaluation of the products containing 0 and 40% dehydrated fish concentrate revealed no significant difference between the products in color, texture, flavor and general taste and acceptance.

Thus, the manufacturing of a surimi based products as described above clearly demonstrated that dehydrated fish concentrate can be used to replace at least up to forty percent of the surimi. The following are typical formulations comparing the ingredients contained in standard commercial surimi to those contained in dehydrated fish concentrate:

|  | % | |
| --- | --- | --- |
|  | Surimi | DFC |
| Minced fish, washed | 96.2 | 100 |
| Sugar, (sorbitol) | 5 | — |
| Salt | 0.5 | — |
| Phosphates | 0.2 | — |

The above formula demonstrate that the surimi contains variously functioning ingredients that are essential for frozen storage stability of the proudct. These ingredients also enhance binding properties of the minced fish.

The production of dehydrated fish concentrate does not require any cryoprotectants since the product can readily be stored at room temperature. This is one of the outstanding and unexpected advantages of the present invention (product and process).

What is claimed is:

1. Method for preparation of modified fish containing food products which includes the steps of mincing surimi seafood and adding thereto a small proportion up to 50% by weight of previously processed dehydrated fish concentrate consisting of dry, storable, dehydrated fibrous fish product produced by mincing followed by a one-step controlled dehydration under reduced pressure and absence of oxidizing atmosphere and temperatures up to 95° C.

2. The method of claim 1 in which from 20% to 40% by weight of the dehydrated fish concentrate which has been subjected to hydration is admixed with the surimi.

3. The method of claim 2 in which the admixture product is subjected to freezing after preparation.

4. A seafood flavored food product containing surimi and a small proportion up to about of 50% by weight dehydrated fish product.

5. The seafood flavored food product of claim 4 in which there is contained therein from about 20% up to about 40% by weight of the dehydrated fish product.

6. The seafood product of claim 5 in which the dehydrated fish product is substantially derived from pollock.

7. The seafood product of claim 5 containing additional well-known and used flavorants and ingredients.

8. The seafood product of claim 5 which contains at least one or more of the principal ingredients derived from a frozen fish component.

9. The seafood product of claim 7 which has a crab meat flavor.

10. The seafood product of claim 7 which has a shrimp flavor.

11. The seafood product of claim 7 which has a scallop flavor.

12. The seafood product of claim 7 which is especially adapted for use as kamaboko.

13. The seafood product of claim 8 which has been subjected to freezing after preparation.

14. The seafood product of claim 8 which is a substantially dried, dehydrated, rehydratable product.

* * * * *